United States Patent [19]

Hölter et al.

[11] 4,206,186
[45] Jun. 3, 1980

[54] REFUSE PYROLYSIS

[75] Inventors: Heinz Hölter, Gladbeck; Heinz Gresch, Dortmund-Derne; Heinrich Igelbüscher, Gladbeck, all of Fed. Rep. of Germany

[73] Assignee: Hölter Gesellschaft für Patentverwertungsverfahren mbH, Fed. Rep. of Germany

[21] Appl. No.: 869,147

[22] Filed: Jan. 13, 1978

Related U.S. Application Data

[63] Continuation-in-part of Ser. No. 605,074, Aug. 15, 1975, Pat. No. 4,123,502, and a continuation-in-part of Ser. No. 844,185, Oct. 21, 1977, which is a continuation-in-part of Ser. No. 683,205, May 4, 1976, Pat. No. 4,061,476.

[30] Foreign Application Priority Data

| Feb. 6, 1975 | [DE] | Fed. Rep. of Germany | 2504839 |
| May 6, 1975 | [DE] | Fed. Rep. of Germany | 2520045 |
| Dec. 9, 1975 | [DE] | Fed. Rep. of Germany | 2555220 |
| Mar. 4, 1976 | [DE] | Fed. Rep. of Germany | 2608935 |
| Apr. 10, 1976 | [DE] | Fed. Rep. of Germany | 2615828 |
| Oct. 21, 1976 | [DE] | Fed. Rep. of Germany | 2647520 |
| Jan. 1, 1977 | [DE] | Fed. Rep. of Germany | 2701800 |

[51] Int. Cl.$^2$ ............................................. B01D 53/34
[52] U.S. Cl. .................................... 423/230; 423/231; 423/236; 423/239; 423/240; 423/244; 48/197 R; 110/242; 110/245; 201/2.5; 210/4; 201/25
[58] Field of Search ............... 423/210, 245, 230, 231, 423/240, 239, 236, 244 A, 244 R; 48/209, 197 R; 201/2.5, 25, 4, 15; 110/342, 345, 346

[56] References Cited

U.S. PATENT DOCUMENTS

| 2,160,341 | 5/1939 | Reichert | 201/2.5 |
| 2,774,726 | 12/1956 | Eichna | 201/4 |
| 3,022,148 | 2/1962 | James | 55/94 |
| 3,414,480 | 12/1968 | Stotler et al. | 201/15 |
| 3,492,083 | 1/1970 | Lowicki et al. | 423/244 A |
| 3,817,724 | 6/1974 | Ellis et al. | 48/209 |
| 3,839,227 | 10/1974 | Schlaefer et al. | 252/455 R |
| 3,970,524 | 7/1976 | Funk | 201/25 |
| 4,105,502 | 8/1978 | Choi | 201/25 |

FOREIGN PATENT DOCUMENTS 1398858 6/1975 United Kingdom ................. 201/2.5

Primary Examiner—Earl C. Thomas
Attorney, Agent, or Firm—Berman, Aisenberg & Platt

[57] ABSTRACT

Organic refuse is pyrolyzed to form disposable solids and gas. The gas is washed at a temperature well above 100° C. with wash oil, which is recirculated. Spent wash oil is pyrolyzed with contaminants and further organic refuse. The washed gas is filtered through sorption means to remove acid and or other noxious gases therefrom before being cooled well below 100° C. to condense water vapor and other constituents having boiling points within the range of from, e.g., 75° to 150° C. After separating the resulting condensate, thus-purified combustion gas is used, e.g., as a fuel source for the organic-refuse pyrolysis.

29 Claims, 1 Drawing Figure

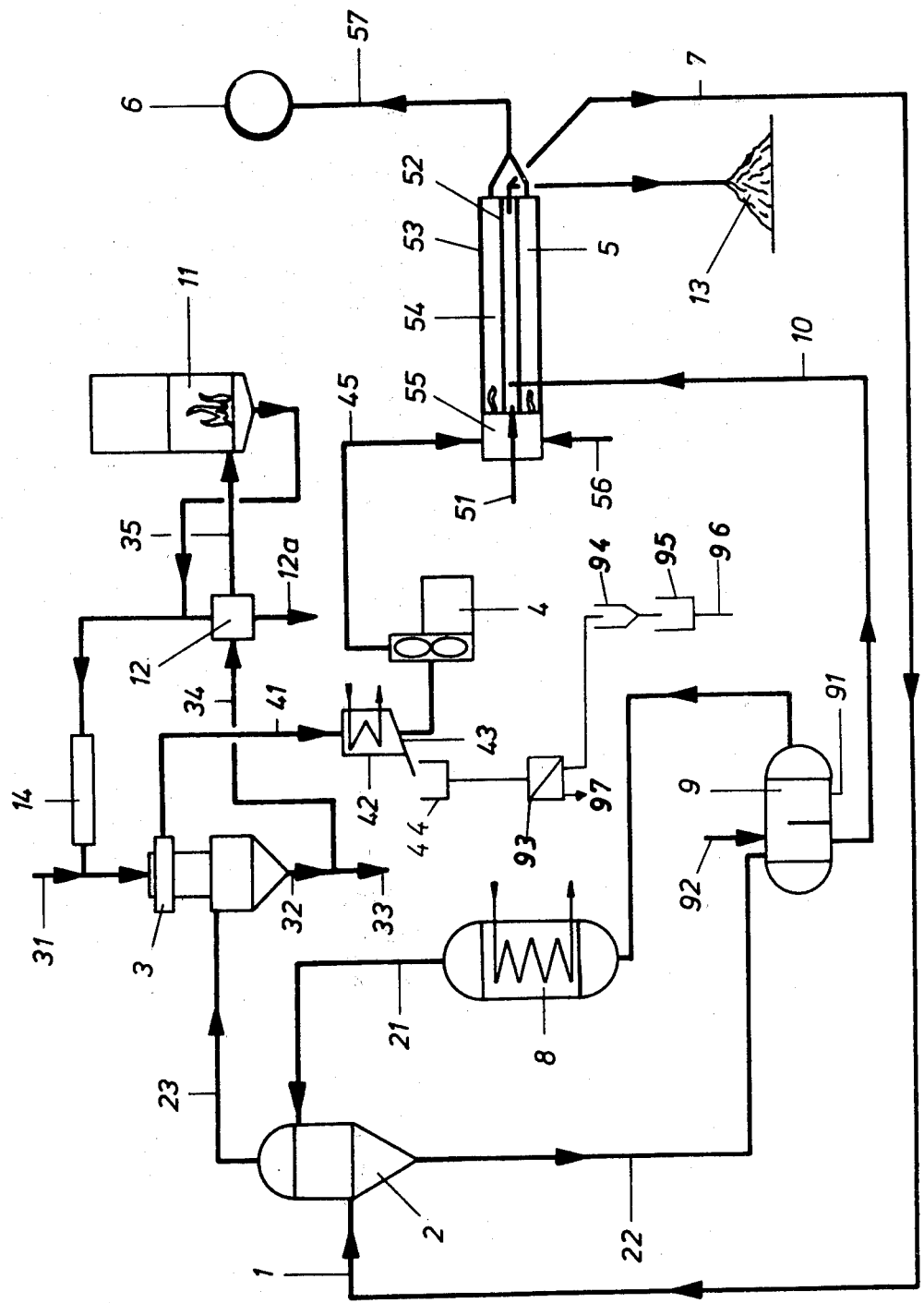

REFUSE PYROLYSIS

RELATED APPLICATIONS

This application is related to the disclosure of U.S. Pat. No. 4,061,479 with regard to illustrative structure for gas washer 2. Although merely by way of example for such structure, the entire disclosure of U.S. Pat. No. 4,061,479 is incorporated herein by reference.

This application is a continuation-in-part of Application Ser. No. 605,074, filed on Aug. 15, 1975, now U.S. Pat. No. 4,123,502, and of Application Ser. No. 844,185, filed on Oct. 21, 1977, the latter being a continuation-in-part of Application Ser. No. 683,205, filed on May 4, 1976, now U.S. Pat. No. 4,061,476. The entire disclosures of the parent applications (Ser. No. 605,074 and Ser. No. 844,185) are incorporated herein by reference.

BACKGROUND

Refuse pyrolysis has assumed increasing importance in recent years as a possible alternative to refuse incineration. Pyrolysis of refuse yields gas that is useful as an energy source or as raw material; besides, suitable by-product gas purification makes such pyrolysis more effective and permits economical operation of even those refuse pyrolysis plants which have a relatively small capacity.

A refuse pyrolysis furnace ordinarily has several zones, e.g. a drying zone, a conversion zone and a gas generation zone. In one particular operation the furnace has the same wall temperature, e.g. about 750° C., in all zones. Refuse in the drying zone, however, attains only a considerably-lower temperature, e.g. 250° C., since drying requires a great deal of heat. Expelled water remains in generated gas in vapor form. Refuse in the conversion zone attains a temperature of, e.g., 550° C. and a temperature of 750° C. is attained in the gas generation zone. Meltable components are melted down and preliminary sintering is effected in the conversion zone, wherein degasification is initiated. All substances which are gasifiable (at degasification temperature) are gasified in the gas generation zone.

Exit gas from the furnace ordinarily contains, in addition to much water (often about 50%), a series of combustible substances, such as $CO$, $CH_4$, $H_2$, $C_2H_4$, $C_2H_6$, $C_6H_6$, and additional harmful or noxious substances, such as $CO_2$, $HF$, $HCl$, $SO_2$, $H_2S$, cyanides, $NO_X$ (e.g. $NO$, $N_2O$, $NO_2$, $N_2O_4$), phenol, benzanthrene, chrysene, naphthalene, naphthenes, furol, acetone, methanol, acetaldehyde and ammonia. The percentages vary greatly, depending upon the charged refuse and pyrolysis parameters, such as temperature. Some of the noted noxious substances, e.g. unsaturated hydrocarbons, form tar-like contaminants in the gas and thus create particular difficulty during gas purification. Unsaturated hydrocarbons tend to polymerize, and such polymerization may be favored by pyrolysis conditions or during subsequent processing.

Water is used to purify the gas from the furnace, also referred to as pyrolysis gas, which has an exit temperature in excess of 600° C., and ordinarily at least 750° C.

As the pyrolysis gas contains a large proportion, perhaps as much as 50%, of water, a large volume of water is obtained during its purification. Some or all of the harmful or noxious substances, as well as useful components of the pyrolysis gas, are likely to become admixed with or part of one or more aqueous or oil phases or a water-oil emulsion. Separation of still-usable constituents of the pyrolysis gas from water is not difficult. Additional difficulties result from the need to purify water (containing harmful or noxious substances) before it can be discharged as waste water. That requires considerable technical effort.

SUMMARY OF THE INVENTION

Purification of pyrolysis gas, particularly that generated from organic-refuse pyrolysis, is effected by washing the gas with a washing liquid prior to further processing or use. The gas is maintained at a temperature well above that for condensation of moisture while being washed and purified. Washing removes solid and high-boiling liquid contaminants from the gas, whereas purifying is effected to sorb (absorb and/or adsorb) noxious, particularly acidic, gaseous contaminants from the washed pyrolysis gas. Only after these noted types of contaminants are separated is the pyrolysis gas cooled sufficiently (if desired) to condense moisture therein, which is subsequently separated.

The process avoids numerous difficulties encountered in previously-attempted counterpart processes. The pyrolysis gas is cooled to a workable temperature in an initial washing stage, but is maintained at a temperature well above the dew point for contained moisture until other (solid, high-boiling liquid and noxious gaseous) contaminants are separated therefrom. When the water vapor in the purified pyrolysis gas is condensed and the gas is freed therefrom, condensed water often does not have to be purified further prior to disposition, and the gas is ready for further use.

BRIEF DESCRIPTION OF THE DRAWING

The sole FIGURE is a block diagram illustrative of a plant in which the subject process is practiced.

DETAILS

Pyrolysis is the transformation, by heat alone, of one substance into one or more other substances. In the instant context the pyrolysis is at least primarily thermal decomposition of carbon-containing material in an atmosphere (excluding air oxygen) in which combustion is precluded.

Refuse includes virtually all organic waste. Ordinarily metallic and other inorganic solids are preliminarily separated therefrom.

Generally one or more pipe-shaped, e.g. rotary-pipe or shaft, furnaces are used for refuse pyrolysis. Regardless of the type or number of vessels employed, the refuse is conducted through various processing phases, such as drying, conversion and gas generation.

Hot pyrolysis gas is washed with a washing oil and, in the process, is cooled to a temperature which is above water's dew point. Thus-washed and cooled gas is liberated from remaining environment-contaminating substances by dry sorption, which is effected with substantially no further cooling. Subsequent cooling condenses contained moisture, which is then readily separated to produce gas useful for heating.

An essentially two-stage purification of pyrolysis gas comprises concurrent washing and cooling with, e.g., a washing oil, cooling being, for example, from 750° C. down to 160° C. In the process, high-molecular weight hydrocarbons, which boil at temperatures above 160° C., as well as dust and other solid substances, are washed out of the pyrolysis gas. The washed pyrolysis gas is then subjected to dry sorption, which removes the harmful or noxious substances, such as HCl, SO$_2$, H$_2$S and NO$_x$, remaining in the pyrolysis gas.

Finally, in addition to moisture, thus-treated pyrolysis gas comprises light hydrocarbons which boil below 160° C. and which impart caloric [heating] value during combustion of the pyrolysis gas. Contained water is conventionally condensed and then readily separated from the resulting purified pyrolysis gas. The purified pyrolysis gas is useful for heating even without prior moisture separation, e.g. for heating the pyrolysis furnace.

The washing oil, used for purifying the pyrolysis gas, is preferably employed in a recirculating system together with washed-out constituents. During washing, so-called pyrolysis oil, solids and harmful or noxious substances are separated from the pyrolysis gas by the washing oil. A portion of the washing oil, containing washed-out components of raw pyrolysis gas, is drawn off and replaced by a corresponding quantity of fresh washing oil.

The fraction of contaminated washing oil that is drawn off is optionally pyrolyzed together with refuse or, e.g., delivered to tar processing companies for further treatment. Drawing off a fraction of recycling washing oil, with entrained contaminants, creates no difficulty since the washing oil is simultaneously used for cooling the hot pyrolysis gas and, in the process, is heated up and becomes comparatively thin and free flowing. By collecting used washing oil in a container and allowing entrained constituents, washed out of raw pyrolysis gas, to settle, such constituents are easily drawn off and conducted to the pyrolysis furnace, as previously described.

Subsequently used washing oil and any components therein are indirectly cooled prior to gas washing to a degree which still assures maintaining the pyrolysis gas at a temperature above the dew point of water. Indirectly cooling the washing oil and any entrained constituents, prior to gas washing, so that washed pyrolysis gas will have a temperature of about 160° C. is recommended. Mineral oils, mineral oil residues or tar oils which have a boiling temperature of at least 240° C. and a flash point above 160° C. are particularly useful as washing oils for washing raw pyrolysis gas in this process. Such oils are known and are available.

For dry sorption thus-washed pyrolysis gas is preferably contacted with adsorption and/or absorption substances which are deposited on a highly temperature-resistant, particularly granular, carrier mass. An especially-suitable carrier mass is expanded perlite, on which iron oxide and/or alkali-metal oxide and/or alkaline-earth-metal oxide and/or heavy metals are deposited as adsorption or absorption substances. In context the alkali metals include, e.g., sodium and potassium; the alkaline-earth metals, e.g., calcium and magnesium; and the heavy metals, e.g., cobalt, nickel and copper.

Dry sorption is optionally effected continuously, e.g., by countercurrently passing washed pyrolysis gas through a fluidized bed of carrier having sorption material deposited on it. In a particular embodiment carrier mass is continually drawn off from the fluidized bed with associated spent sorption material, and thus-withdrawn carrier mass is replaced with carrier mass containing unused or reactivated sorption substances.

Spent sorption substances are optionally treated further. The carrier mass with spent sorption substance thereon is, e.g., removed from the fluidized bed and moved to a waste disposal area, wherein carrier mass is, e.g., combined with deposited sorption agent and harmful substances in cement, water glass, etc.

Alternatively, spent sorption material is separated from the carrier mass by screening and taken from the fluidized bed. Fresh or reactivated sorption substances are deposited on carrier mass from which spent sorption agent has been removed, and the revitalized sorption mass is introduced into the fluidized bed. Screened, spent sorption substances are optionally deposited in a waste-disposal dump, e.g., after combination with cement or water glass.

Pyrolysis gas, washed with washing oil and further purified by dry sorption, is useful at a temperature, for example 160° C., above its dew point, for burning to improve the energy supply for pyrolysis. The pyrolysis gas is also useful, after condensing comprised moisture by cooling, for heating the pyrolysis furnace or for other purposes. The resultant condensate is optionally separated into its components, water and light hydrocarbons, such as benzene, xylenes, toluene and pyrolysis benzene. The light hydrocarbons are separately salable. The remaining water, only slightly contaminated with light hydrocarbons, is filtered through activated carbon prior to disposal as waste water. To attain the most complete possible separation of water and light hydrocarbons, the gas is cooled to a temperature of about 30° C. If, however, the gas is introduced into the local or long distance gas grid, cooling to a temperature of about 4° C. may be required. For heating the pyrolysis oven the gas may be used uncooled, e.g. at 160° C.

With reference to the drawing, the refuse to be treated is charged at 51 into a pyrolysis furnace generally labeled 5 and comprising a substantially cylindrical vessel 52, in which raw refuse is transported from left to right, using a mechanism which is not illustrated. The vessel 52 is surrounded by another, substantially cylindrical vessel 53, which, with vessel 52, forms annular space 54, which is in communication with a combustion chamber 55 at the inlet of the pyrolysis furnace and in which a combustion gas, for example natural gas, supplied at 56, is burned up. The combustion gases flow through the annular chamber 54 and, at the end of the pyrolysis furnace 5 which is located opposite the combustion chamber 55, move out into a waste gas pipeline 57. The combustion chamber, with a chimney 6, is intended for the combustion of the start-up gas.

The solid residue, formed by pyrolysis of the refuse, is removed from the pyrolysis furnace as residue 13, which can be dumped. The pyrolysis gas, released during pyrolysis, is piped to a gas washer 2 through a pipeline 7 and, via inlet 1, is introduced into the gas washer. Gas washer 2 is of any suitable structural design, e.g. that of German patent application No. P 25 53 856.1 or P 26 24 187.2, respectively, of U.S. Pat. No. 4,061,479 or of German Pat. No. 1,932,058.

In gas washer 2, the pyrolysis gas is washed with a washing oil which is supplied to the gas washer 2 via a pipeline 21. The washing oil is atomized and whirled in gas washer 2 so that it comes into intimate contact with the pyrolysis gas and is subsequently separated. The separated washing oil is drawn off from the gas washer 2 via a pipeline 22 and is moved to a collection tank 9, from which it is recycled into pipeline 21 by a pump which is not illustrated.

When entering the gas washer 2, the pyrolysis gas has a temperature of about 800° C. This causes the initially-cooler washing oil to heat up during passage through gas washer 2; the pyrolysis gas is concurrently cooled off during washing in gas washer 2. In order to avoid an inordinate heating of the washing oil, a cooler 8, which is operated with cooling water, is provided in pipeline 21. The washing oil is cooled, prior to introduction into the gas washer 2, to such a temperature that the washed pyrolysis gas, leaving gas washer 2, will have a temperature of about 160° C. Consequently, gas washing with the washing oil takes place at a temperature above water's dew point. A temperature of about 160° C. is also above the dew point of light hydrocarbons which are consequently not picked up by the washing oil and remain in the pyrolysis gas. Dust and solid substances, as well as high-molecular weight hydrocarbons (boiling above the working temperature of about 160° C.) are washed out of the pyrolysis gas in gas washer 2.

The washing oil in collecting tank 9 has a comparatively low viscosity because of its elevated temperature; this facilitates settling of dust and solid substances, which consequently collect at the bottom 91 of collecting tank 9. They are easily withdrawn from the bottom 91 via a pipeline, such as 10, which conducts them into the pyrolysis vessel 52, in which they are pyrolyzed together with refuse being passed therethrough. The washing oil and attendant contaminants (withdrawn from tank 9 and pyrolyzed) are gasified to as great an extent as possible and thus become part of the pyrolysis gas. Fresh washing oil is added at 92 as replacement for the quantity of washing oil withdrawn.

Tar oil is preferred as washing oil, but mineral oil or mineral residue oil, for example used oil, are suitable alternatives. Respective tar oils are preferably obtained from coking of hard coal; they start boiling at 250° C., and 94% of the oil is distilled at 300° C. Preferably, the oil does not comprise naphthalene. The washing oil should have a boiling point within the range of from 210° to 300° C. or higher. This boiling point range requirement is satisfied by naphthalene-free tar oils, which also have a flash point, as desired, above the working temperature, i.e. above about 160° C. High-boiling fractions of mineral oil or treated residues from the distillation of mineral oil may be used. The softening point of the washing oil is preferred to be above 20° to 40° C., and the flow point, between 80° and 100° C.

The washed pyrolysis gas is moved from gas washer 2 via pipeline 23 to a fluidized bed reactor 3 and countercurrently through a fluidized bed mass therein. The fluidized bad mass consists of expanded perlite, as carrier substance, on which adsorbing and absorbing substances are deposited. Illustrative sorption substances, deposited on the carrier substance, include, e.g., iron oxide and/or alkali-metal oxide and/or alkaline-earth-metal oxide and/or heavy metal. Sorption substances and carriers may be used, as disclosed in our co-pending patent application Ser. No. 844,185. Alkaline substances, e.g. calcium hydroxide may be added if, depending on the particular refuse, the pyrolysis gas contains a large amount of acid. The fluidized bed mass, with the fresh sorption agent, is charged into the fluidized bed reactor at 31. The fluidized bed mass runs through the fluidized bed reactor 3 under the influence of gravity from the top down to the bottom, while washed pyrolysis gas is conducted countercurrently from the bottom to the top. Depending upon the harmful- or noxious-substance content of the pyrolysis gas, the speed at which the sorption substances flow through the fluidized bed mass is appropriately adjusted.

The lower section of fluidized bed reactor 3 has a bucket wheel lock, not illustrated, with which spent fluidized bed mass, i.e. the carrier mass with the spent sorption agent thereon, is drawn off. Connected to the bucket wheel lock, pipeline 32 evacuates spent fluidized bed mass and, for example, conducts it to a dump 33. The fluidized bed mass, consisting of carrier substance and spent sorption substances, is optionally bound with cement or water glass and then conveyed to the dump.

At least part of the spent fluidized bed mass is, optionally, further processed. For this purpose, the entire spent fluidized bed mass or a portion thereof is conducted, e.g., via a pipeline 34 to a screen 12, which separates spent sorption agent 12a from the carrier mass. Then the spent-sorption-agent-free carrier mass, e.g. expanded perlite, is transmitted to a mechanism 14 in which fresh sorption agent is again deposited on the carrier mass. The carrier material, provided with fresh sorption agent in mechanism 14, is then recycled into the fluidized bed reactor via the charge line 31.

Spent, screened-out, carrier substance is alternatively conducted via a pipeline 35 to a combustion chamber 11 in which any possible small quantities of harmful-substance deposits are burned up at temperatures in excess of 800° C. The carrier mass, consisting of expanded perlite, is highly temperature-resistant and is subsequently reused, for example, by conducting it into a mechanism 14 and depositing fresh sorption substances thereon.

The pyrolysis gas, contacted in the fluidized bed reactor 3 with dry sorption agent, still retains a temperature of about 160° C., to which it had been adjusted in the gas washer 2. The dry sorption agents in the fluidized bed reactor remove virtually all harmful substances, such as fluoride, hydrochloric acid, sulfur dioxide, hydrogen sulfide, cyanides, $NO_x$, phenol, acetic acid and formaldehyde, as well as oil aerosols which have been swept along, from the pyrolysis gas. All available hydrocarbons which boil below the washing temperature of 160° C. likewise pass into and through the fluidized bed reactor 3. These hydrocarbons are not absorbed by the fluidized bed. In addition, the pyrolysis gas leaving the fluidized bed reactor 3 still contains water vapor.

Blower 4 pulls the washed pyrolysis gas, further purified by dry sorption agent, from the fluidized bed reactor 3 via pipeline 41. An indirect cooler 42, operated with cooling water and containing a separator or trap 43, is provided in this pipeline. The pyrolysis gas is cooled to a temperature of about 30° C. in cooler 42. Water vapor and light hydrocarbons, such as pyrolysis benzene, benzene, toluene and xylenes, condense at this temperature and are separated and collected in a tank 44 as condensate. The water condensate, which still contains from 1 to 1.5 g/l of light hydrocarbons, is piped through a separator 93 and an activated carbon filter 94 and is collected in a catch basin 95. After passing an appropriate purity test, the water is discharged at 96. Hydrocarbons are collected at 97. Consumed activated carbon is, e.g. conveyed to the pyrolysis reactor and pyrolyzed together with the refuse. The produced hydrocarbons are, likewise, further used.

The pyrolysis gas, which is cooled to about 30° C. and from which condensate has been separated, is then conveyed, e.g., via pipeline 45 to the combustion chamber 55 of the pyrolysis furnace 5, in which it is burned. In that way the energy supply to the pyrolysis furnace 5 is improved.

An exemplary embodiment follows. This example is presented soley for the purpose of illustration and in no way limits the nature or scope of the invention.

This example refers to treatment by pyrolysis of a refuse comprising water (e.g. 10 to 40%), organic components (e.g. 20 to 50%) and mineral components (e.g. 20 to 50%), as produced on the European Continent, e.g. in Germany. The composition of the refuse, of course, substantially varies by place and time. In the following example 750 to 1000 kg/h of refuse are treated by pyrolysis, and the pyrolysis gas comprises 250 to 300 liters of liquid substance condensed at 30° C. The following analysis, however, is on a dry-gas basis.

As a result of the dry sorption process, carbon dioxide is virtually not removed from the pyrolysis gas, the sorption agent being used to remove the stronger acids.

In this example (1000 Nm$^3$/h of wet pyrolysis gas) the wash oil passing through the washer is about 2000 l/h, the sorption material is about 40 kg/h and, for cooling, about 35 m$^3$/h of fresh water are used; this quantity, of course, can be greatly reduced by recirculating and cooling.

The process, however, may be used for treatment of any other quantity of any refuse.

About 1,000 standard m$^3$/hr of pyrolysis gas are generated in the pyrolysis furnace at a temperature of about 800° C. The generated pyrolysis gas has the following composition (on a water-free basis):

| Raw Pyrolysis Gas (dry) | | |
|---|---|---|
| hydrogen | ≅ | 30% |
| carbon monoxide | ≅ | 25% |
| methane | ≅ | 10% |
| higher hydrocarbons | ≅ | 5% |
| carbon dioxide | ≅ | 25% |
| HCl, H$_2$S, HF | ≅ | 3% |
| nitrogen | ≅ | 2% |

After washing and concurrent cooling to about 160° C. in gas washer 2, the pyrolysis gas has the following analysis (on a water-free basis):

| Washed Pyrolysis Gas (dry) | | |
|---|---|---|
| hydrogen | ≅ | 31% |
| carbon monoxide | ≅ | 26% |
| methane | ≅ | 11% |
| higher hydrocarbons | ≅ | 1% |
| carbon dioxide | ≅ | 26% |
| HCl, H$_2$S, HF | ≅ | 3% |
| nitrogen | ≅ | 2% |

After purification through dry sorption agent, e.g., in the fluidized bed reactor 3 the pyrolysis gas is constituted (on a water-free basis) as follows:

| Purified Pyrolysis Gas (dry) | | |
|---|---|---|
| hydrogen | ≅ | 32% |
| carbon monoxide | ≅ | 24% |
| methane | ≅ | 11% |
| higher hydrocarbons | ≅ | 1% |
| carbon dioxide | ≅ | 27% |
| HCl, H$_2$S, HF | = | nil |
| nitrogen | ≅ | 2% |

Finally, the pyrolysis gas entering combustion chamber 55 is moisture free and has the following composition:

| Water-Free Pyrolysis Gas | | |
|---|---|---|
| hydrogen | ≅ | 32.3% |
| carbon monoxide | ≅ | 27.3% |
| methane | ≅ | 11.1% |
| higher hydrocarbons | ≅ | traces |
| carbon dioxide | ≅ | 27.3% |
| HCl, H$_2$S, HF | = | nil |
| nitrogen | ≅ | 2.0% |

About 4,000 liters of washing oil are recycled through the washer at a rate of about 4 liters per cubic meter of pyrolysis gas (at 160° C.). The temperature of the washing oil entering the washer is about 125° C. To cool the washing oil in cooler 8 and for indirect cooling of the pyrolysis gas in cooler 42, about 7,000 l /hr of cooling water (which is not contaminated or enriched by harmful substances and can thus be readily discharged) are required. About 50 to 60l/hr of condensate water, containing about 1 to 1.5 g/l of light hydrocarbons, are obtained. The consumption of sorption material is at a rate of about 8 kg/hr.

The invention and its usefulness are readily appreciated by the artisan from the preceding description, which is merely illustrative. Various changes and modifications can be made in the process and equipment employed without departing from the spirit and scope of the invention or sacrificing its material advantages.

What is claimed is:

1. A two-stage process for purifying noxious-component-containing pyrolysis gas, having a temperature in excess of 600° C., which comprises: (a) concurrently washing and substantially cooling the pyrolysis gas with washing oil to separate virtually only liquids having a boiling point in excess of the dew point of water and solids therefrom and b) contacting the washed and cooled pyrolysis gas with dry sorption agent to separate noxious gaseous components therefrom while maintaining the temperature of the pyrolysis gas above the dew point of water.

2. A method according to claim 1 which comprises water-cooling the washing oil indirectly prior to washing the pyrolysis gas.

3. A process according to claim 1 wherein the washing oil is mineral oil, mineral residue oil or tar oil.

4. A process which comprises heating a pyrolysis furnace with fuel, obtaining noxious-component-containing raw pyrolysis gas from the pyrolysis furnace and purifying the raw pyrolysis gas according to the two-stage process of claim 1, the fuel for heating the pyrolysis furnace comprising thus-purified pyrolysis gas.

5. A process which comprises heating a pyrolysis furnace with fuel, obtaining from the pyrolysis furnace noxious-component-containing raw pyrolysis gas having a substantial proportion of water vapor therein, purifying the raw pyrolysis gas according to the two-stage process of claim 1, cooling thus-purified pyrolysis gas to a temperature below the dew point of water to produce a condensate comprising water and separating the condensate from the remaining purified gas, the fuel for heating the pyrolysis furnace comprising said purified gas from which the water has been separated.

6. A process which comprises pyrolyzing organic refuse to produce a solid residue and pyrolysis gas containing noxious gaseous components and purifying the pyrolysis gas according to the two-stage process of claim 1.

7. A process according to claim 6 which further comprises recycling the washing oil to wash further quantities of pyrolysis gas, withdrawing contaminants, removed from the pyrolysis gas by the washing oil, with a portion of said washing oil, pyrolyzing the withdrawn portion of washing oil and encompassed contaminants with the organic refuse and replacing with fresh washing oil the portion withdrawn from th recycling washing oil.

8. A method according to claim 7 which comprises water-cooling the recycling washing oil indirectly to the extent required to reduce the temperature of the pyrolysis gas, during washing, to 160° C.

9. A process according to claim 1 wherein the dry sorption agent comprises adsorption and/or absorption means deposited on a highly temperature-resistant carrier mass.

10. A process according to claim 9 wherein the carrier mass is expanded perlite.

11. A process according to claim 9 wherein the sorption agent comprises at least one member selected from the group consisting of iron oxide, alkali-metal oxide, alkaline-earth-metal oxide and heavy metal.

12. A process according to claim 1 wherein stage (b) comprises countercurrently passing the washed and cooled pyrolysis gas through a fluidized bed of sorption agent deposited on a carrier mass.

13. A process according to claim 12 which comprises withdrawing spent sorption agent and carrier mass on which it is deposited from the fluidized bed, binding them with at least one member selected from the group consisting of cement and water glass and dumping the resulting product.

14. A process according to claim 12 which comprises withdrawing spent sorption agent and carrier mass on which it is deposited from the fluidized bed, screening the spent sorption agent from associated carrier mass, burning any possible remaining deposits on the thus-screened carrier mass at a temperature in excess of 800° C., depositing fresh sorption agent on the resulting carrier mass and reintroducing said resulting carrier mass, with fresh sorption agent deposited thereon, into the fluidized bed.

15. A process according to claim 12 which comprises withdrawing from the fluidized bed spent sorption agent and carrier mass on which it is deposited, screening the spent sorption agent and thus separating it from associated carrier mass, depositing fresh sorption agent on thus-separated carrier mass and reintroducing the carrier mass, with the fresh sorption agent deposited thereon, into the fluidized bed.

16. A process according to claim 15 which comprises binding thus-separated spent sorption agent with at least one member selected from the group consisting of cement and water glass and dumping the resulting product.

17. A process according to claim 1 wherein the pyrolysis gas contains a substantial proportion of water vapor.

18. A process according to claim 17 which further comprises cooling the purified pyrolysis gas from stage (b) to a temperature below the dew point of water to produce a condensate comprising water and light hydrocarbons, separating the condensate from the gas and contacting the separated condensate with activated carbon to purify the water by removing light hydrocarbons therefrom.

19. A process according to claim 18 wherein the temperature below the dew point of water to which the purified pyrolysis gas from stage (b) is cooled to about 30° C.

20. A process according to claim 1 wherein the washing oil is mineral oil.

21. A process according to claim 1 wherein the washing oil is mineral oil residue.

22. A process according to claim 1 wherein the washing oil is tar oil.

23. A process according to claim 22 wherein the tar oil has a boiling temperature of at least 240° C. and a flash point above 160° C.

24. A process according to claim 22 wherein the tar oil has a boiling point of at least 210° C.

25. A process according to claim 24 wherein the tar oil is naphthalene-free tar oil.

26. A process according to claim 1 wherein the washing oil has a softening point in a range of from about 20° to 40° C. and a flowpoint between 80° and 100° C.

27. A process according to claim 1 wherein any noxious component is a member selected from the group consisting of $CO_2$, HF, HCl, $SO_2$, $H_2S$, a cyanide, NO, $N_2O$, $NO_2$, $N_2O_4$, phenol, benzanthrene, chrysene, naphthalene, a naphthene, furol, acetone, methanol, acid aldehyde and ammonia, and the dry sorption agent constitutes means for sorbing the noxious component.

28. A process according to claim 27 wherein the pyrolysis gas is that generated from organic-refuse pyrolysis.

29. A process according to claim 11 wherein the heavy metal is a member selected from the group consisting of cobalt, nickel and copper.

* * * * *